United States Patent
Wang et al.

(10) Patent No.: US 12,358,102 B2
(45) Date of Patent: Jul. 15, 2025

(54) MULTI-FUNCTIONAL BENCH VICE WITH QUICK-CHANGE JAW

(71) Applicant: Laizhou Hongyuan Bench Vice Manufacture Co., Ltd., Laizhou (CN)

(72) Inventors: Tao Wang, Laizhou (CN); Shujun Zhao, Laizhou (CN); Kai Zhang, Laizhou (CN); Xiaoguang Lin, Laizhou (CN); Maodou Li, Laizhou (CN)

(73) Assignee: Laizhou Hongyuan Bench Vice Manufacture Co., Ltd., Laizhou (CN)

( * ) Notice: Subject to any disclaimer, the term of this patent is extended or adjusted under 35 U.S.C. 154(b) by 329 days.

(21) Appl. No.: 18/138,147

(22) Filed: Apr. 24, 2023

(65) Prior Publication Data

US 2024/0278385 A1    Aug. 22, 2024

(30) Foreign Application Priority Data

Feb. 17, 2023  (CN) .......................... 202310142284.7

(51) Int. Cl.
- *B25B 1/00* (2006.01)
- *B25B 1/02* (2006.01)
- *B25B 1/10* (2006.01)
- *B25B 1/20* (2006.01)

(52) U.S. Cl.
CPC ............... *B25B 1/103* (2013.01); *B25B 1/02* (2013.01); *B25B 1/20* (2013.01)

(58) Field of Classification Search
CPC ............... B25B 1/00; B25B 1/10; B25B 1/02
See application file for complete search history.

(56) References Cited

U.S. PATENT DOCUMENTS

| | | | | |
|---|---|---|---|---|
| 1,048,100 | A * | 12/1912 | Rorig | B25B 1/2452 269/271 |
| 6,152,435 | A * | 11/2000 | Snell | B25B 1/2452 269/282 |
| 6,196,536 | B1 * | 3/2001 | Hintze | B25B 1/2405 269/282 |
| 6,672,578 | B1 * | 1/2004 | Martens | B25B 1/2468 269/282 |

(Continued)

FOREIGN PATENT DOCUMENTS

| | | |
|---|---|---|
| CN | 2284670 Y | 6/1998 |
| CN | 103522177 A | 1/2014 |

(Continued)

*Primary Examiner* — Lee D Wilson
(74) *Attorney, Agent, or Firm* — Bayramoglu Law Offices LLC (57) ABSTRACT

A multi-functional bench vice with a quick-change jaw includes a movable vice body, a fixed vice body, a screw rod, and a handle. The fixed vice body is provided with a fixed jaw. A quick-change assembly and a movable jaw assembly are installed on the movable vice body. The quick-change assembly includes an adjustment rod and a pull rod. The adjustment rod is installed on the movable vice body through an external thread, and is connected to one end of the pull rod through the internal thread. The helical direction of the external thread is opposite to the helical direction of the internal thread. The other end of the pull rod passes through the movable vice body and is clamped on the movable jaw assembly. The movable jaw assembly corresponds to the fixed jaw.

10 Claims, 8 Drawing Sheets

(56) References Cited

U.S. PATENT DOCUMENTS

| | | | |
|---|---|---|---|
| 2002/0171191 A1* | 11/2002 | Hudson | B25B 1/241 269/279 |
| 2006/0055098 A1* | 3/2006 | Siegel | B25B 1/2452 269/279 |
| 2006/0108729 A1* | 5/2006 | Siegel | B25B 1/2421 269/266 |
| 2006/0284359 A1 | 12/2006 | Healy et al. | |
| 2009/0020937 A1* | 1/2009 | Odell | B25B 1/2468 269/271 |
| 2010/0072240 A1* | 3/2010 | Cornes | B25B 1/103 224/536 |
| 2014/0306394 A1* | 10/2014 | Winn | B25B 1/24 269/282 |
| 2023/0158641 A1* | 5/2023 | Kuter-Arnebeck | B25B 1/2489 269/229 |

FOREIGN PATENT DOCUMENTS

| | | |
|---|---|---|
| CN | 210524864 U | 5/2020 |
| CN | 219170621 U | 6/2023 |

\* cited by examiner

MULTI-FUNCTIONAL BENCH VICE WITH QUICK-CHANGE JAW

CROSS REFERENCE TO THE RELATED APPLICATIONS

This application is based upon and claims priority to Chinese Patent Application No. 202310142284.7, filed on Feb. 17, 2023, the entire contents of which are incorporated herein by reference.

TECHNICAL FIELD

The present invention relates to the technical field of bench vices, in particular to a multi-functional bench vice with a quick-change jaw.

BACKGROUND

A bench vice is a general fixture used to clamp a workpiece. The bench vice includes a movable vice body and a fixed vice body. A movable jaw is installed on the movable vice body through a screw, and a fixed jaw is installed on the fixed vice body through a screw. The workpiece is placed in the jaws, and then the movable vice body is moved to the fixed vice body, so that the movable jaw cooperates with the fixed jaw to clamp the workpiece.

The working surfaces of the movable jaw and the fixed jaw are generally flat. In practice, the workpiece with a regular body is relatively few. Due to the special outline of the workpiece, the traditional flat jaw cannot be adjusted to fit with the surface of the workpiece according to the actual situation, resulting in unstable clamping. If the workpiece is forcibly clamped, the surface or body of the workpiece is easily damaged to affect the surface accuracy of the finished product. In the prior art, in order to clamp cylindrical workpieces with different diameters, a V-shaped groove or a semicircular groove is typically arranged on the working surface of the jaw for replacing the jaw, so as to meet the clamping requirements of workpieces of different sizes. Since the jaw is installed on the vice body through a screw, when the jaw is replaced, the movable vice body needs to move away from the fixed vice body for a certain distance, then the jaw is removed from the vice body by an inner hexagonal wrench, and finally the new jaw is installed on the vice body through the screw. After the bench vice is used for a period of time, greasy dirt is easily accumulated on the jaw, so that it is necessary to clean up the greasy dirt when the screw is disassembled, which is inefficient. Moreover, the space between the two jaws is limited, which increases the risk of hurting the hand during disassembling and assembling, and brings inconvenience to the user.

In addition, in the prior art, the conical workpiece is clamped through the jaw having a planar working surface, resulting in an unstable state. If the vice bodies are processed with different conicity according to the conicity of the workpieces, it is troublesome to store different types of vice bodies, and also it results in the additional processing cost and inconvenient disassembly.

SUMMARY

The first technical problem to be solved by the present invention is to provide a bench vice for quickly replacing the jaw, aiming at the inconvenient replacement of the jaw in the prior art.

The second technical problem to be solved by the present invention is to provide a multi-functional bench vice, aiming at the problem that the conical workpiece is not firmly clamped in the prior art.

The technical solution of the present invention to solve the above technical problems is as follows: a multi-functional bench vice with a quick-change jaw includes a movable vice body, a fixed vice body, a screw rod, and a handle. The movable vice body is slidably installed on the fixed vice body. One end of the screw rod is connected to the handle, and the other end of the screw rod passes through the movable vice body and is connected to the fixed vice body through threads. A fixed jaw is arranged on the fixed vice body. A quick-change assembly and a movable jaw assembly are installed on the movable vice body. The quick-change assembly includes an adjustment rod and a pull rod. The adjustment rod is provided with an external thread and an internal thread. The adjustment rod is installed on the movable vice body through the external thread, and the adjustment rod is connected to one end of the pull rod through the internal thread. The helical direction of the external thread is opposite to the helical direction of the internal thread. The other end of the pull rod passes through the movable vice body and is clamped on the movable jaw assembly. The movable jaw assembly corresponds to the fixed jaw.

The advantages of the present invention are as follows: Since the internal thread and the external thread of the adjustment rod have opposite helical directions, the adjustment rod and the pull rod move relative to each other by two thread pitches after the adjustment rod turns once, which improves the disassembly efficiency of the jaw assembly. The adjustment rod can be disassembled on the outside of the jaw, which has unlimited operating space, and the lower difficulty of disassembly. The adjustment rod is far away from the working surface of the jaw, so that greasy dirt is less blocked in the adjustment rod. The operation is convenient without hand injury, thereby keeping the safety of use.

On the basis of the above technical solution, in order to achieve the convenience of use and the stability of the device, the present invention can also make the following improvements to the above technical solution:

Further, the movable jaw assembly includes a quick-change base and a quick-change jaw. A positioning portion is arranged on the movable vice body, and the quick-change base is installed on the positioning portion. The quick-change base is provided with an arc groove recessed inward. One side of the quick-change jaw is provided with a working surface corresponding to the fixed jaw, and the other side of the quick-change jaw is provided with a guide body protruding outward. The guide body is slidably arranged in the arc groove. The movable jaw assembly is configured to adaptively adjust an angle between the quick-change jaw and the fixed jaw.

The advantages of adopting the above further technical solution are as follows: Through the cooperation of the guide body and the arc groove, the quick-change jaw slides along the arc groove, so that the angle between the quick-change jaw and the fixed jaw is adaptively adjusted to meet the clamping requirements of workpieces with different conicity, and the clamping is firm, thereby reducing the number of jaws and the cost.

Further, the movable jaw assembly further includes a positioning pin, and the quick-change base is provided with a positioning hole corresponding to the positioning pin. One end of the positioning pin is installed on the movable vice body, and the other end of the positioning pin is inserted in the positioning hole.

The advantages of adopting the above further technical solution are as follows: The quick-change base is positioned by the positioning pin, which reduces the difficulty of assembly and ensures that the quick-change base is stably installed on the movable vice body.

Further, the guide body is provided with a positioning groove, and the positioning groove extends along the guide body. The positioning pin passes through the positioning hole and is inserted in the positioning groove.

The advantages of adopting the above further technical solution are as follows: The positioning groove cooperates with the positioning pin to prevent the guide body from sliding out of the arc groove and improve the convenience of use. The angle adjusted by the quick-change jaw is controlled by setting the positioning grooves with different radians.

Further, the side of the quick-change base adjacent to the quick-change jaw is provided with an avoidance region.

The advantages of adopting the above further technical solution are as follows: The interference between the quick-change jaw and the quick-change base is avoided when the quick-change jaw moves, which improves the range of the adaptive adjustment angle of the quick-change jaw and meets the clamping requirements of workpieces with different conicity.

Further, the positioning portion is provided with an accommodating groove, and the lower end face of the quick-change base is provided with a recess. An end of the pull rod is provided with a protrusion, and the protrusion is arranged in the accommodating groove and the recess.

The advantages of adopting the above further technical solution are as follows: The overall structure of the bench vice is more compact. The protrusion cooperates with the recess to ensure that the quick-change base is stably installed. Moreover, the connection is simple, the disassembly is convenient, and the disassembly efficiency is improved.

Further, the cross section of the arc groove and the cross section of the guide body are dovetail-shaped.

The advantages of adopting the above further technical solution are as follows: It is ensured that the quick-change jaw slides steadily along the quick-change base to avoid shaking and ensure the firmness of clamping the workpiece.

Further, the number of the arc groove is at least one, and the number of the quick-change jaw and the number of the positioning pin correspond to the number of the arc groove.

The advantages of adopting the above further technical solution are as follows: Multiple quick-change jaws are arranged to meet the clamping requirements of multiple workpieces with the same conicity or different conicity, which improves the convenience and versatility of use and reduces the number of jaws and the processing cost.

Further, an end of the adjustment rod is provided with an inner hexagonal portion. The external thread of the adjustment rod is a left-handed thread, and the internal thread of the adjustment rod is a right-handed thread.

The advantages of adopting the above further technical solution are as follows: the adjustment rod is conveniently disassembled to reduce the difficulty of operation, and the connection is easy.

Reference numbers in the figures: 1. movable vice body; 101. accommodating groove; 2. fixed vice body; 3. quick-change base; 301. arc groove; 302. recess; 303. avoidance region; 4. quick-change jaw; 401. guide body; 402. positioning groove; 5. adjustment rod; 6. pull rod; 7. positioning pin; 8. fixed jaw; 9. screw rod; 10. nut; 11. spring; 12. washer; 13. elastic cylindrical pin; and 14. handle.

DETAILED DESCRIPTION OF THE EMBODIMENTS

The principle and characteristics of the present invention are described with reference to the drawings, and the embodiments given are only used to explain the present invention and are not used to limit the scope of the present invention.

Embodiment 1

As shown in FIGS. 1-7, the present invention discloses a multi-functional bench vice with a quick-change jaw, including the movable vice body 1, the fixed vice body 2, the screw rod 9, and the handle 14. The movable vice body 1 is slidably installed on the fixed vice body 2. One end of the screw rod 9 is connected to the handle 14, and the other end of the screw rod 9 passes through the movable vice body 1 and is connected to the nut 10 on the fixed vice body 2 through threads. The spring 11 is sleeved on the screw rod. One end of the spring 11 abuts against the inner wall of the movable vice body 1, and the other end of the spring 11 is provided with the washer 12 and is fixed by the elastic cylindrical pin 13. The fixed jaw 8 is arranged on the fixed vice body 2, and the fixed jaw 8 is provided with a non-slip texture. A quick-change assembly and a movable jaw assembly are installed on the movable vice body 1. The quick-change assembly includes the adjustment rod 5 and the pull rod 6. The adjustment rod 5 is provided with an external thread and an internal thread. The adjustment rod 5 is installed on the movable vice body 1 through the external thread, and the adjustment rod 5 is connected to one end of the pull rod 6 through the internal thread. The helical direction of the external thread is opposite to the helical direction of the internal thread. The other end of the pull rod 6 passes through the movable vice body 1 and is clamped on the movable jaw assembly. The movable jaw assembly corresponds to the fixed jaw 8.

In the present embodiment, one quick-change jaw 4, one adjustment rod 5 and one pull rod 6 are arranged. An end of the adjustment rod 5 is provided with an inner hexagonal portion, so that the user can conveniently disassemble the adjustment rod 5 through a hexagonal wrench, thereby improving the convenience of disassembling. The external thread of the adjustment rod 5 is a left-handed thread, and the internal thread of the adjustment rod 5 is a right-handed thread. When the adjustment rod 5 turns once toward the movable vice body 1, the relative distance between the adjustment rod 5 and the pull rod 6 is increased by two thread pitches, so that the pull rod 6 pushes out the quick-change base 3 and the quick-change base 3 is quickly disassembled. When the adjustment rod 5 turns once outward relative to the movable vice body 1, the relative distance between the adjustment rod 5 and the pull rod 6 is decreased by two thread pitches, so that the pull rod 6 drives the quick-change base 3 to move to the movable vice body 1 and the quick-change base 3 is quickly installed and fixed. The operation process is simple, and the disassembly efficiency is improved. The adjustment rod 5 is installed inside the movable vice body 1 through the external thread, which reduces the greasy dirt blocking in the adjustment rod 4 and reduces the overall size of the bench vice.

Optionally, the end of the adjustment rod 5 may be provided with a quadrilateral portion. The external thread of the adjustment rod 5 is a right-handed thread, and the internal thread of the adjustment rod 5 is a left-handed thread. Similarly, when the adjustment rod 5 turns once, the adjustment rod 5 is screwed in or out by two thread pitches, thereby improving the disassembly efficiency.

The movable jaw assembly includes the quick-change base 3 and the quick-change jaw 4. A positioning portion is arranged on the movable vice body 1, and the quick-change base 3 is installed on the positioning portion. The quick-change base 3 is initially installed and positioned to reduce the difficulty of installation. The quick-change base 3 is provided with the arc groove 301 recessed inward. One side of the quick-change jaw 4 is provided with a working surface corresponding to the fixed jaw 8. The working surface is a smooth plane, and the working surface cooperates with the fixed jaw 8 to clamp a workpiece. The other side of the quick-change jaw 4 is provided with the guide body 401 protruding outward, and the guide body 401 is slidably arranged in the arc groove 301. The movable jaw assembly is configured to adaptively adjust the angle between the quick-change jaw 4 and the fixed jaw 8. Through the cooperation of the guide body 401 and the arc groove 301, the quick-change jaw 4 slides along the arc groove 301, so that the angle between the quick-change jaw 4 and the fixed jaw 8 is adaptively adjusted to meet the clamping requirements of workpieces with different conicity, and the clamping is firm, thereby reducing the number of jaws and the cost.

The movable jaw assembly further includes the positioning pin 7, and the quick-change base 3 is provided with a positioning hole corresponding to the positioning pin 7. One end of the positioning pin 7 is installed on the movable vice body 1, and the other end of the positioning pin 7 is inserted in the positioning hole. The quick-change base 3 is positioned by the positioning pin 7, which reduces the difficulty of assembly and ensures that the quick-change base 3 is stably installed on the movable vice body 1.

The guide body 401 is provided with the positioning groove 402, and the positioning groove 402 extends along the guide body 401. The positioning pin 7 passes through the positioning hole and is inserted in the positioning groove 402. The positioning groove 402 cooperates with the positioning pin 7 to prevent the guide body 401 from sliding out of the arc groove 301 and improve the convenience of use. The angle adjusted by the quick-change jaw 4 is controlled by setting the positioning grooves 402 with different radians to meet the clamping requirements of workpieces with different conicity.

The side of the quick-change base 3 adjacent to the quick-change jaw 4 is provided with the avoidance region 303 that is configured to avoid the interference between the quick-change jaw 4 and the quick-change base when the quick-change jaw 4 moves along the arc groove 301, thereby increasing the range of the adaptive adjustment angle of the quick-change jaw 4 and meeting the clamping requirements of workpieces with different conicity.

The middle part of the positioning portion is provided with the accommodating groove 101, and the middle part of the lower end face of the quick-change base 3 is provided with the recess 302. The end of the pull rod 6 is provided with a protrusion, and the protrusion includes an arc end and a flat end. The arc end is arranged in the recess 302, and the flat end is arranged in the accommodating groove 101. When the adjustment rod 5 drives the pull rod 6 to move, the pull rod 6 cooperates with the recess 302 through the protrusion to drive the quick-change base 3 and the quick-change jaw 4 to move. In this way, the quick-change jaw 4 is quickly replaced, and the quick-change base 3 is stably installed. The connection is simple, the disassembly is convenient, and the disassembly efficiency is improved.

The cross section of the arc groove 301 and the cross section of the guide body 401 are dovetail-shaped. It is ensured that the quick-change jaw 4 slides steadily along the quick-change base 3 to avoid shaking and ensure the firmness of clamping the workpiece.

At least one arc groove 301 is provided, and the number of the quick-change jaw 4 and the number of the positioning pin 7 correspond to the number of the arc groove 301. Multiple quick-change jaws 4 are arranged to meet the clamping requirements of multiple workpieces with the same conicity or different conicity, which improves the convenience and versatility of use and reduces the number of jaws and the processing cost. In the present embodiment, one arc groove 301 is arranged.

Embodiment 2

Figure 1:
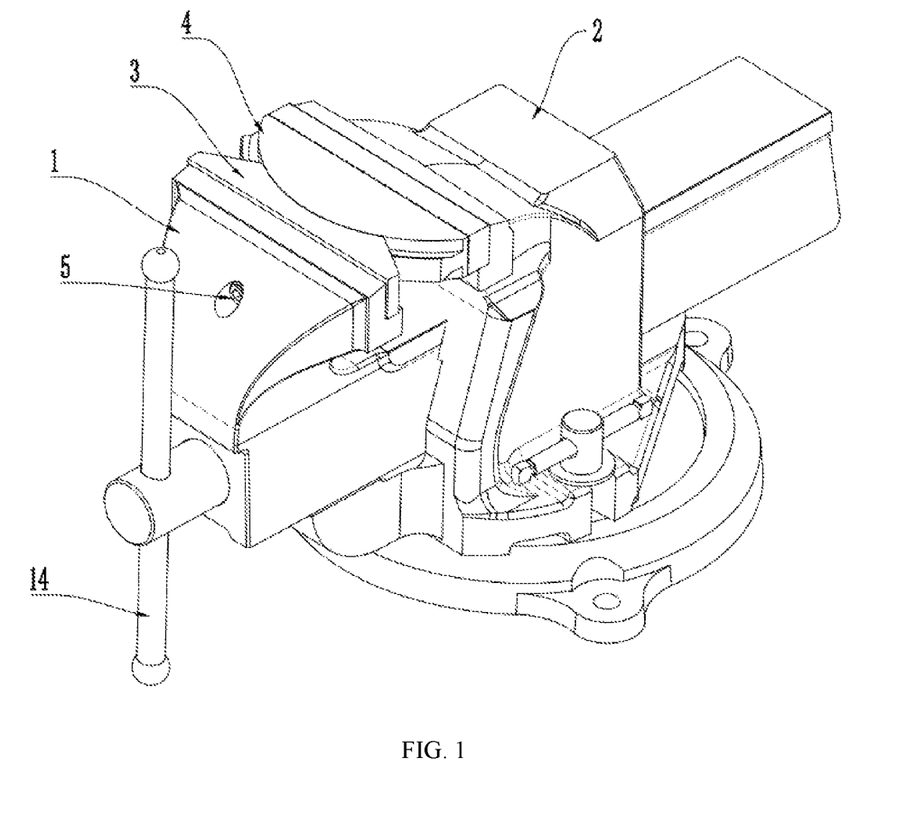
FIG. 1 is a perspective diagram of Embodiment 1 of the present invention.
Figure 2:
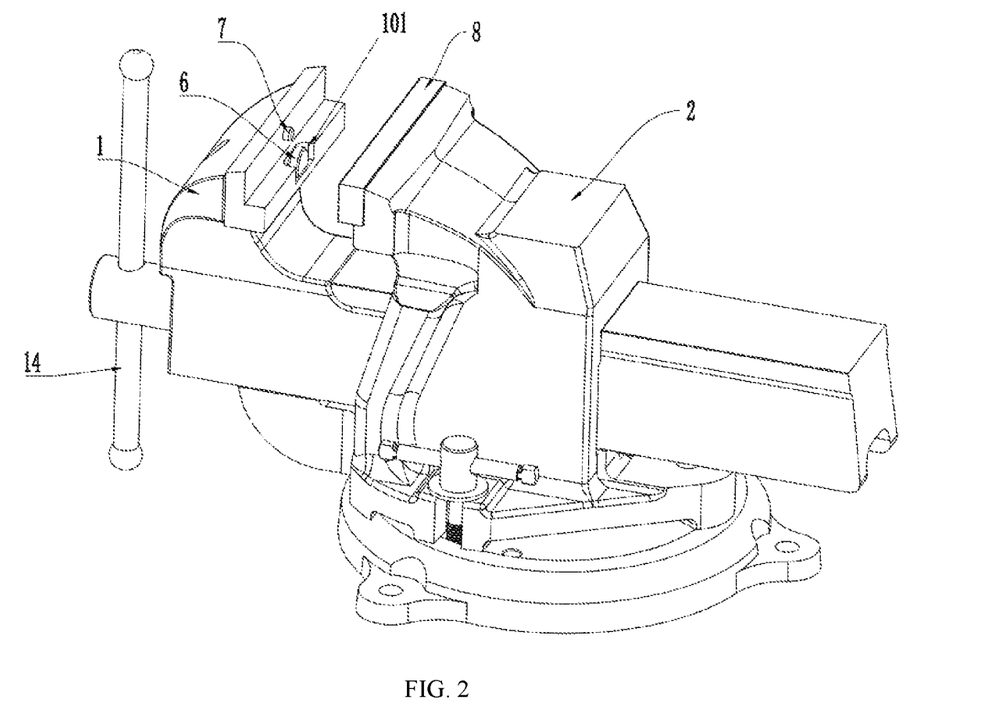
FIG. 2 is a schematic diagram showing the installation of a quick-change assembly in Embodiment 1 of the present invention.
Figure 3:
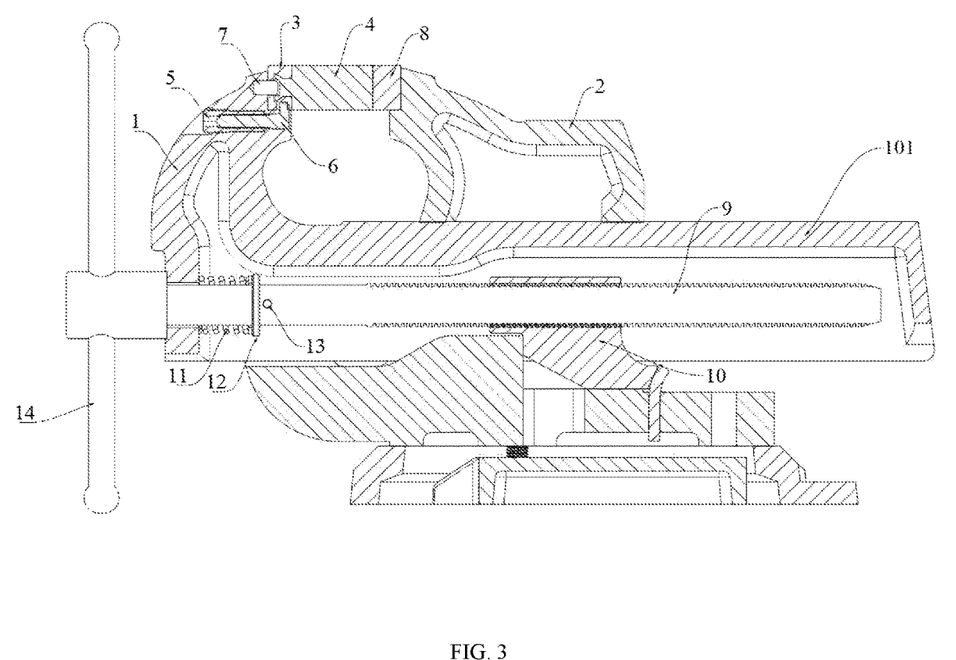
FIG. 3 is a cross-sectional view of a multi-functional bench vice in Embodiment 1 of the present invention.
Figure 4:
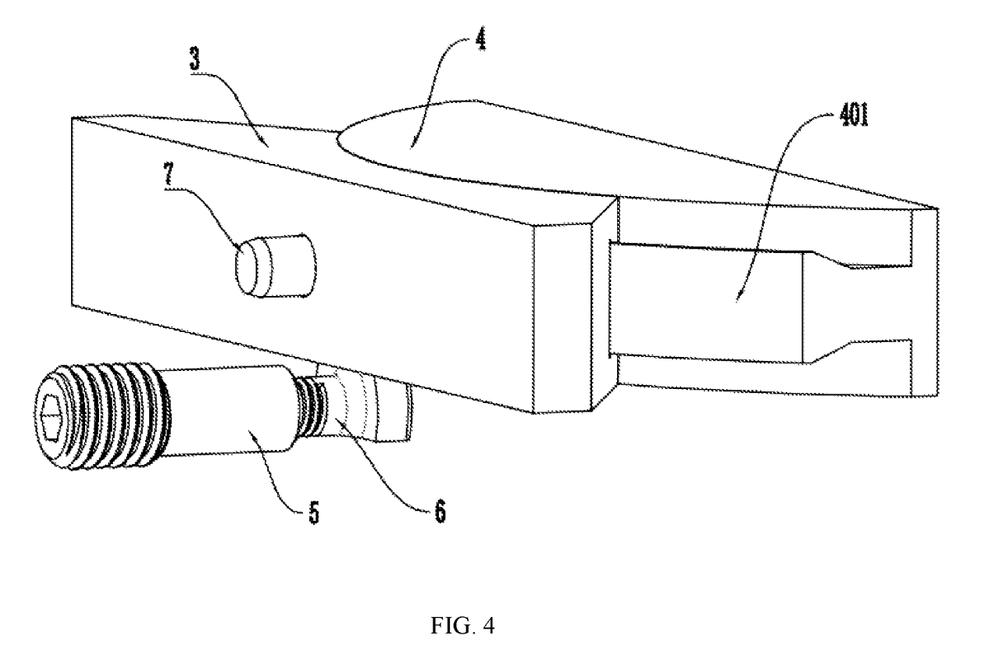
FIG. 4 is a schematic diagram of a quick-change assembly and a movable jaw assembly in Embodiment 1 of the present invention.
Figure 5:
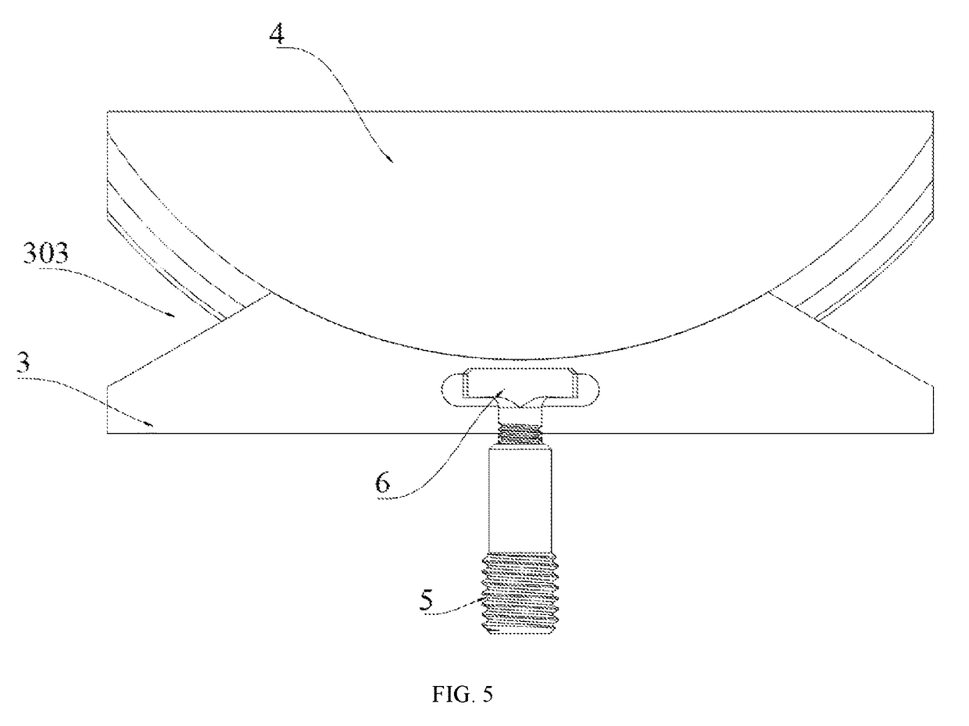
FIG. 5 is a schematic diagram showing the connection between a pull rod and a quick-change base in Embodiment 1 of the present invention.
Figure 6:
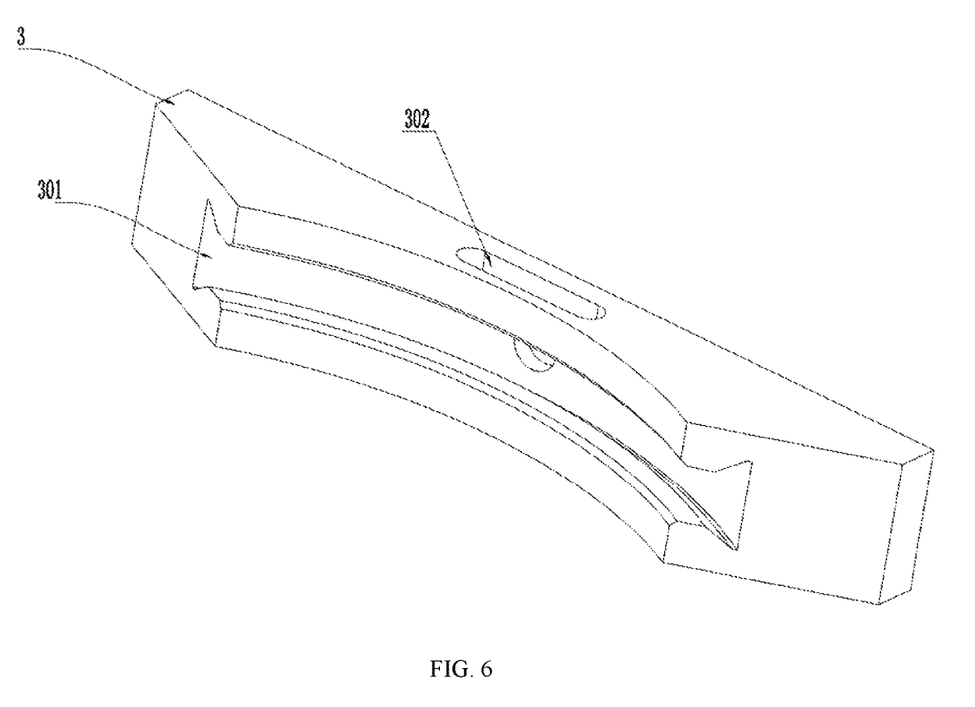
FIG. 6 is a schematic diagram of the quick-change base in Embodiment 1 of the present invention.
Figure 7:
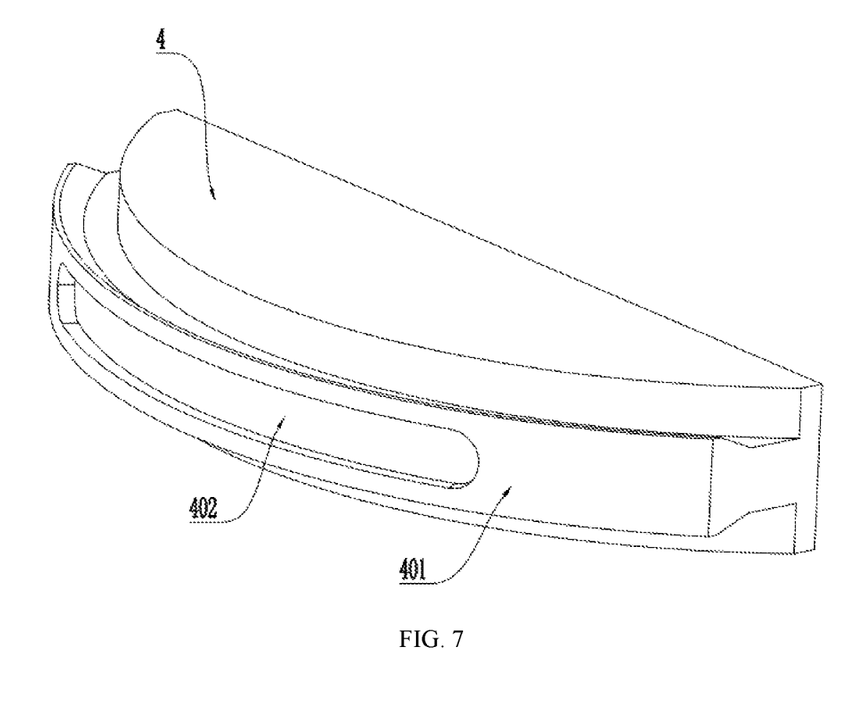
FIG. 7 is a schematic diagram of a quick-change jaw in Embodiment 1 of the present invention.
Figure 8:
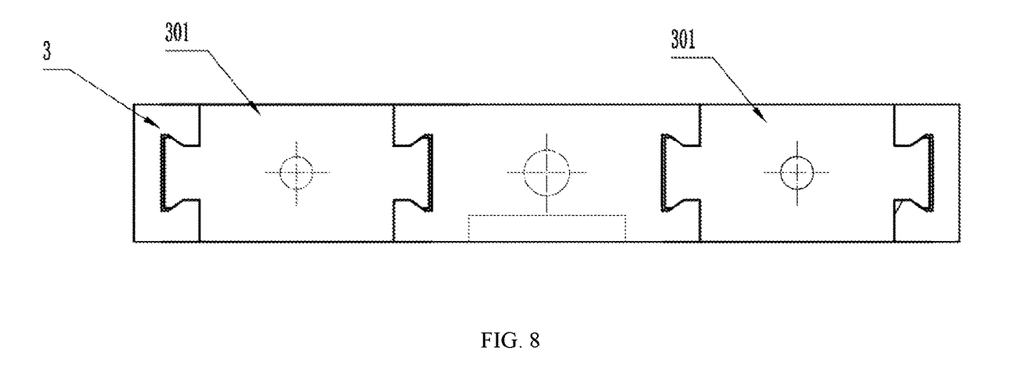
FIG. 8 is a schematic diagram of a quick-change base in Embodiment 2 of the present invention.
Figure 9:
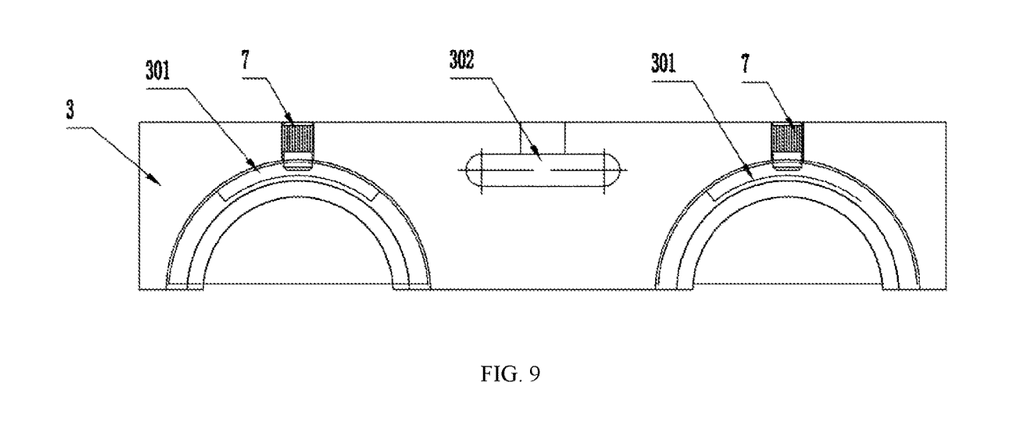
FIG. 9 is a schematic diagram showing the cooperation between the quick-change base and positioning pins in Embodiment 2 of the present invention.

As shown in FIGS. 8-9, the number of arc grooves 301 is different from that in Embodiment 1.

In the present embodiment, the quick-change base 3 is provided with two arc grooves 301, one quick-change jaw 4 and one positioning pin 7 are correspondingly installed in each arc groove 301. The positioning pin 7 can prevent the quick-change jaw 4 from sliding out of the arc groove 301, so that the quick-change jaw 4 moves smoothly in the arc groove 301. The quick-change base 3 is provided with one recess 302 between the two arc grooves 301, so that the pull rod 6 drives the quick-change base 3 to move through the recess 302. By setting two quick-change jaws 4, two workpieces can be clamped at the same time to improve the clamping efficiency, which meets the clamping requirements of the workpieces with small conicity, and improves the convenience of operation.

The above only describes preferred embodiments of the present invention without limiting the present invention. Any modifications, equivalent replacements, improvements, and the like made within the spirit and principles of the present invention shall fall within the scope of protection of the present invention.

What is claimed is:

1. A multi-functional bench vice with a quick-change jaw, comprising a movable vice body, a fixed vice body, a screw rod, and a handle; wherein the movable vice body is slidably installed on the fixed vice body; a first end of the screw rod is connected to the handle, and a second end of the screw rod passes through the movable vice body and is connected to the fixed vice body through threads; a fixed jaw is arranged on the fixed vice body; a quick-change assembly and a movable jaw assembly are installed on the movable vice body; the quick-change assembly comprises an adjustment rod and a pull rod; the adjustment rod is provided with an external thread and an internal thread; the adjustment rod is installed on the movable vice body through the external thread, and the adjustment rod is connected to a first end of the pull rod through the internal thread; a helical direction of the external thread is opposite to a helical direction of the internal thread; a second end of the pull rod passes through the movable vice body and is clamped on the movable jaw assembly; and the movable jaw assembly corresponds to the fixed jaw.

2. The multi-functional bench vice according to claim 1, wherein the movable jaw assembly comprises a quick-change base and the quick-change jaw; a positioning portion is arranged on the movable vice body, and the quick-change base is installed on the positioning portion; the quick-change base is provided with an arc groove recessed inward; a first side of the quick-change jaw is provided with a working surface corresponding to the fixed jaw, and a second side of the quick-change jaw is provided with a guide body protruding outward; the guide body is slidably arranged in the arc groove; and the movable jaw assembly is configured to adaptively adjust an angle between the quick-change jaw and the fixed jaw.

3. The multi-functional bench vice according to claim 2, wherein the movable jaw assembly further comprises a positioning pin, and the quick-change base is provided with a positioning hole corresponding to the positioning pin; a first end of the positioning pin is installed on the movable vice body, and a second end of the positioning pin is inserted in the positioning hole.

4. The multi-functional bench vice according to claim 3, wherein the guide body is provided with a positioning groove, and the positioning groove extends along the guide body; and the positioning pin passes through the positioning hole and is inserted in the positioning groove.

5. The multi-functional bench vice according to claim 2, wherein a side of the quick-change base is provided with an avoidance region, wherein the side of the quick-change base is adjacent to the quick-change jaw.

6. The multi-functional bench vice according to claim 2, wherein the positioning portion is provided with an accommodating groove, a lower end face of the quick-change base is provided with a recess, the second end of the pull rod is provided with a protrusion, and the protrusion is arranged in the accommodating groove and the recess.

7. The multi-functional bench vice according to claim 2, wherein a cross section of the arc groove and a cross section of the guide body are dovetail-shaped.

8. The multi-functional bench vice according to claim 4, wherein a number of the arc groove is at least one, and a number of the quick-change jaw and a number of the positioning pin correspond to the number of the arc groove.

9. The multi-functional bench vice according to claim 1, wherein an end of the adjustment rod is provided with an inner hexagonal portion, the external thread of the adjustment rod is a left-handed thread, and the internal thread of the adjustment rod is a right-handed thread.

10. The multi-functional bench vice according to claim 4, wherein a side of the quick-change base is provided with an avoidance region, wherein the side of the quick-change base is adjacent to the quick-change jaw.

\* \* \* \* \*